United States Patent [19]

Pettersson

[11] Patent Number: 4,459,076

[45] Date of Patent: Jul. 10, 1984

[54] DEVICE FOR VERTICAL TRANSPORT OF GOODS

[76] Inventor: Kent G. Pettersson, Violvagen 25, S-190 60 Balsta, Sweden

[21] Appl. No.: 336,352

[22] PCT Filed: May 7, 1981

[86] PCT No.: PCT/SE80/00133

§ 371 Date: Jan. 4, 1982

§ 102(e) Date: Jan. 4, 1982

[87] PCT Pub. No.: WO81/03164

PCT Pub. Date: Nov. 12, 1981

[51] Int. Cl.³ .............................................. B65G 57/14
[52] U.S. Cl. ...................................... 414/78; 414/83; 414/84; 414/564; 414/662
[58] Field of Search ............... 414/564, 592, 282, 662, 414/663, 78, 83, 84; 187/17, 20, 1 R

[56] References Cited

U.S. PATENT DOCUMENTS 3,095,984  7/1963  Lindkvist .................. 414/592 X
3,187,917  6/1965  Miller ....................... 414/592 X
3,490,616  1/1970  Castaldi .................... 414/282 X
3,536,194 10/1970  Novak ....................... 414/282 X
3,799,377  3/1974  Suizu ........................ 414/564
3,863,777  2/1975  Murata ...................... 414/282

FOREIGN PATENT DOCUMENTS 2620535 11/1977  Fed. Rep. of Germany.
 200217 11/1965  Sweden.

Primary Examiner—Leslie J. Paperner
Assistant Examiner—Janice Krizek
Attorney, Agent, or Firm—Fleit, Jacobson, Cohn & Price

[57] ABSTRACT

A machine for vertical transportation of goods from a packing line onto a pallet. The machine includes a vertically movable lifting device provided on a horizontally travelling wagon, the device being provided with lifting forks for receiving and lowering the pieces of packages. Counterweights are provided on the travelling wagon, the counterweights being connected to the lifting device by wires. The counterweights are heavier than the lifting device but the weight thereof is less than the total weight of the lifting device and the thereon loaded pieces of packages. The transmission comprises an endless loop, which is fixedly mounted to the lifting device, which is driven by a motor. During a cycle of operations the pieces of packages are fed from a packing line out onto the lifting forks of the machine until they abut a start impulse switch that starts the motor. Due to the weight of goods, the lifting forks are lowered until they are stopped by the pallet. Then the motor pulls the travelling wagon backwardly. In a rear position, the motor is reversed by a switch. Then, the lifting device provided with the lifting forks is drawn upwardly by the counterweights until it reaches a mechanical stop. The motor continues to be in operation and pulls the travelling wagon forwardly until it reaches a terminal position switch that stops the cycle of operations. The cycle of operations is repeated until the pallet has been loaded up to a desired level.

5 Claims, 2 Drawing Figures

DEVICE FOR VERTICAL TRANSPORT OF GOODS

TECHNICAL FIELD

The present invention relates to an apparatus for vertical transport of goods, for instance transportation of pieces of packages from a packing line or a conveyor onto a pallet.

PRIOR ART

Devices for successively lowering a pallet as pieces of packages are moved onto the pallet are previously known in connection with loading of pallets. It is also previously known to use a lifting fork to lower received pieces of packages down onto a pallet, which is not moved during the operation. The previously known devices are often constructed in an unnecessarily complicated way both as far as the mechanical system is concerned as well as concerning the control system. The previously known devices of this type, as illustrated by the structures described in Swedish patent specification No. 200.217 and DE Offenlegungsschrift No. 26 20 535 are used for lowering pieces of packages from a conveyor onto a pallet. According to DE Offenlegungsschrift No. 26 20 535 the apparatus thereof is provided with lifting forks for receiving and lowering pieces of packages onto a pallet, and then specific wipers are used for wiping the pieces of packages off the lifting forks and onto the pallet. For that cycle of operations three separate chain transmissions are used, all driven by its own individual motor, and in one alternative one of said transmissions is replaced by a hydraulic cylinder.

A SHORT STATEMENT OF THE PRESENT INVENTION

The technical problem to be solved by the present invention relates to lowering pieces of packages from an upper level, for instance a conveyor, down to a lower level, for instance a pallet. This operation was previously carried out either manually or by the aid of complicated, voluminous and expensive machines.

The above problem is solved in accordance with the present invention by using one single transmission driven by one single motor for performing the intended cycle of operations. An endless transmission belt or chain is used for co-operating with one single electrical motor for obtaining both a horizontal and a vertical movement when the apparatus performs a cycle of operations. Preferably, counterweights are used in order to balance the weight of the lifting device according to the invention.

The advantages obtained by the present invention are among other things that a relatively simple mechanical structure is obtained, that only a minimum force consumption is necessary, that an uncomplicated electrical control system is used, which all result in a fail-safe and low energy consuming machine having a very low total weight. When carefully chosing the weights of the counterweights used in the machine in relation to the weight of the pieces of packages to be handled by the machine it is possible to use a drive motor of a small size, which results in a low energy consuming structure.

DESCRIPTION OF THE PREFERRED EMBODIMENT

Figure 1:
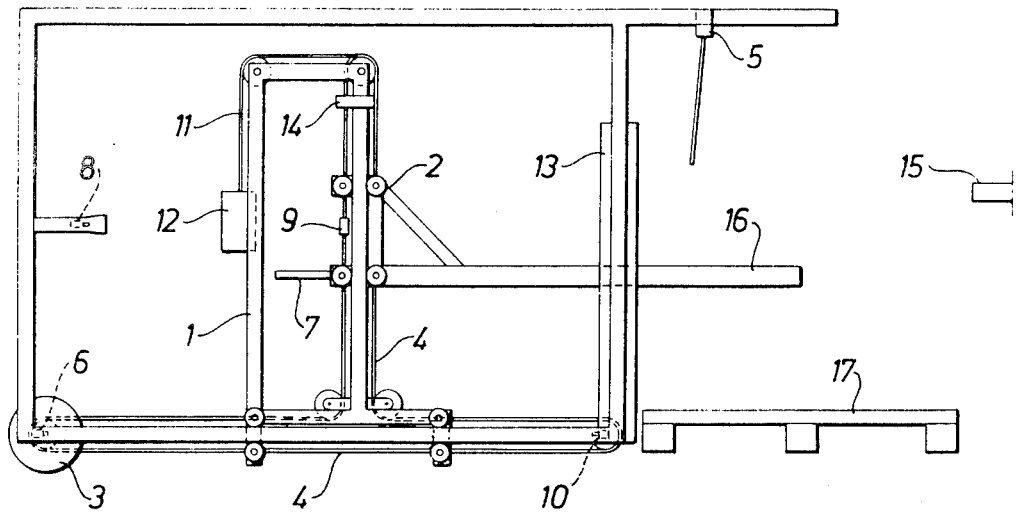
FIG. 1 is illustrating in a schematic side elevational view a preferred embodiment of the device according to the invention.

A preferred embodiment of the invention is illustrated in the figures and comprises a machine for loading pieces of packages from a packing line 15 down onto a pallet 17. The machine comprises a horizontally travelling waggon 1 provided with a vertically movable lifting device 2 having lifting forks 16 for receiving and lowering the pieces of packages. Counterweights 12 are arranged in connection with the horizontally travelling waggon 1, said counterweights being connected by wires 11 to the vertically movable lifting device 2. By using said counterweights there is only need for a minimum effect to be used both in connection with raising and lowering the lifting forks 16. The transmission means comprises in the preferred embodiment an endless cogged belt 4, which is connected at 9 to the vertically movable lifting device 2 and is driven by one single small electrical motor 3.

In the beginning of an operation cycle the lifting forks 16 are located at the same level as the packing line 15 in a fixed position obtained by the counterweights 12, a manually adjustable mechanical stop 14 and the cogged belt 4, which is braked to stand-still by the still standing (inoperative) electrical motor 3. The horizontally travelling waggon 1 is standing in its forward-most position against a mechanical, resilient stop. The pieces of packages coming from the packing line 15 are fed out onto the lifting forks 16 of the machine and abut, when they are fed sufficiently far, a sensing pin connected to a starting impulse switch 5. The starting impulse switch 5 is starting the electrical motor 3. The motor 3 generates a constant, braking torque when the lifting forks 16 of the vertically movable lifting device 2 are lowered, due to the weight of the pieces of packages loaded thereon down to a pallet 17 located at a lower level. When the lifting forks 16 have reached and abut the pallet 17, or the wagon or the stacked goods, further vertical movement of the forks is prevented and the vertically extending part of the cogged belt 4 is fixed relative to the wagon, the wagon then continuing in a horizontal direction. Then, the electrical motor 3, without changing its counterclockwise direction of rotation is, by the aid of the horizontally extending part of the cogged belt 4 pulling the horizontally travelling waggon 1, backwardly from the pallet 17. Since the vertically movable lifting device 2 is mounted on the horizontally travelling waggon 1 the lifting forks 16 do also move backwardly. However, the pieces of packages resting on the lifting forks 16 are stopped against support rolls 13, which in the preferred embodiment are fixedly mounted at the side of the lifting forks 16. When the lifting forks 16 are pulled away the pieces of packages will rest upon the pallet 17. The horizontally travelling waggon 1 will continue to be moved backwardly by the motor until the tips of the lifting forks 16 are moved into a position between the support rolls 13. Then, the horizontally travelling waggon 1 is contacting a change-over switch 6, thereby reversing the rotation of the electrical motor 3.

The vertically movable lifting device 2 will then be pulled upwardly by the aid of the counterweights 12 at a speed determined by the rotational speed of the electrical motor 3, which will act in a braking way during this movement. When the vertically movable lifting device 2 has reached the level of the packing line 15 it is stopped by a manually adjustable mechanical stop 14 and the vertically movable part of the cogged belt 4 is fixed and the electrical motor 3 will, via the horizontally extending part of the cogged belt 4, draw the horizontally travelling waggon 1 forwardly until it reaches a mechanical, resilient stop and a limit switch 10, which both stops and reverses the polarity of the electrical motor 3. The lifting forks 16 are now located at the packing line 15 ready to receive new pieces of packages.

In the next cycle of operations the vertically movable lifting device 2 and the lifting forks 16 thereof are lowered (supplied with pieces of packages) till they are stopped by the pieces of packages previously loaded on the pallet 17. The horizontally travelling waggon 1 will then, via the horizontally extending part of the cogged belt 4, be drawn backwardly by the electrical motor 3. The pieces of packages will be stopped by the support rolls 13 and when the lifting forks 16 have been moved completely inside the space between said rolls the pallet 17 is loaded by two layers of pieces of packages.

In the above indicated way the loading operation will continue until the desired top level has been reached.

At the top level there is provided a blocking switch 8 at the rearmost part of the machine in such a way that it is contacted by a contact arm 7 fixedly mounted on the vertically movable lifting device 2 and stops the electrical motor 3 when the lifting forks 16 are provided in a backward position.

Then, when the loaded pallet has been removed, either manually or automatically, and been replaced by an empty pallet the machine may again be started, the lifting forks 16 will return to the starting position at the packing line 15. If desired, also said starting operation may be automatic.

MODIFIED EMBODIMENTS

Even though a presently preferred embodiment of the invention above has been described with reference to the attached figures the persons skilled in the applicable art realize that the device may be modified within the frame of the accompanying claims. Hence, the motor has been illustrated by an electrical motor even though it is possible to use another driving source, such as a compressed air motor, which also can be located at any place along the machine. The transmission belt has been illustrated by a cogged belt, but of course, chains or wires may also be used alternatively. Of course, also the counterweights may be replaced by force balancing blocks or resilient means, such as spring means and the like, since the effect thereof is only to counterbalance the weight of the vertically movable lifting device. The mentioned support rolls 13 may, of course, also be replaced by other suitable means for wiping off the pieces of packages onto the pallet or previously loaded layers of pieces of packages.

INDUSTRIAL USE

The present invention is useful in connection with any type of industry wherein packages, boxes, containers or other pieces of packages should be transferred from an upper level, for instance a packing line or a conveyor, down to a lower level, for instance a pallet or a stack of previously loaded pieces of packages. Since the invention provides a simple, cheap and reliable machine of a universally useful type the industrial use thereof is extensive.

I claim:

1. A machine for vertical transportation of goods from a feeding line onto a pallet by the aid of a vertically movable lifting device carried by a vertical guiding structure, said machine comprising:
   a base frame having a forward end and a rear end;
   a wagon horizontally movable on said base frame between a forward terminal stop and a rear terminal stop, said wagon carrying a vertical guide structure;
   an endless transmission loop element having two horizontal portions extending between forward and rear pullies fixed at said forward and rear ends of said frame respectively;
   one of said horizontal loop portions being branched into two vertical loop portions between a first pulley at the bottom of said guide structure onto and over a second pulley at the top of said guide structure and back to a third pulley at the bottom of said guide structure;
   a lifting device being vertically movable on said guide structure between said wagon and an upper stop at the top portion of said vertical guide structure, the lifting device being fixed to one of said vertical loop portions;
   a motor for driving said closed loop element to impart vertical displacement of the lifting device and horizontal displacement of the wagon by the intermediary of said closed transmission loop element; and
   an electrical control system controlling the horizontal and vertical displacements whereby the alteration between the vertical movement of the lifting device and the horizontal movement of the wagon being in response to the contact of the lifting device with at least one of the wagon, the pallet and goods on the pallet at one extreme and the stop at the other extreme to prevent movement of the vertical portion of the loop thereby causing horizontal movement of the wagon.

2. A machine according to claim 1, wherein said motor is electrically powered and said endless transmission loop element is one of a toothed belt, a chain and a wire.

3. A machine according to claim 2, further comprising counterweight means slidingly arranged on said vertical guiding structure and connected to the vertically movable lifting device by a wire element, said counterweight means being greater in weight than the total weight of the vertically movable lifting device, whereby said lifting device at the returning upward movement due to the weight of said counterweight means, firstly moves vertically towards a manually adjustable, mechanical stop located on said vertical guide structure and after hitting the stop, continuously moves horizontally towards a feeding line.

4. A machine according to claim 3, wherein said electrical control system includes a starting impulse switch for starting the operating cycle of the motor by contact of a good from the feeding line with said starting impulse switch, a change-over contact switch for reversing the rotational direction of said electrical motor by contact of the lifting device with said changeover contact switch, and a terminal position switch for stopping the lifting device at a starting position near the feeding line.

5. A machine according to claim 4, further comprising a vertically adjustable blocking switch arranged to be contacted by a contact arm fixedly mounted upon the vertically movable lifting device when said device has reached a predetermined load height of goods as determined by said blocking switch.

* * * * *

UNITED STATES PATENT AND TRADEMARK OFFICE
CERTIFICATE OF CORRECTION

PATENT NO. : 4,459,076
DATED : July 10, 1984
INVENTOR(S) : Gustaf PETTERSON

Page 1 of 2

It is certified that error appears in the above-identified patent and that said Letters Patent are hereby corrected as shown below: Substitute Figures 1 and 2 attached hereto for Figures 1 and 2 of the issued patent.

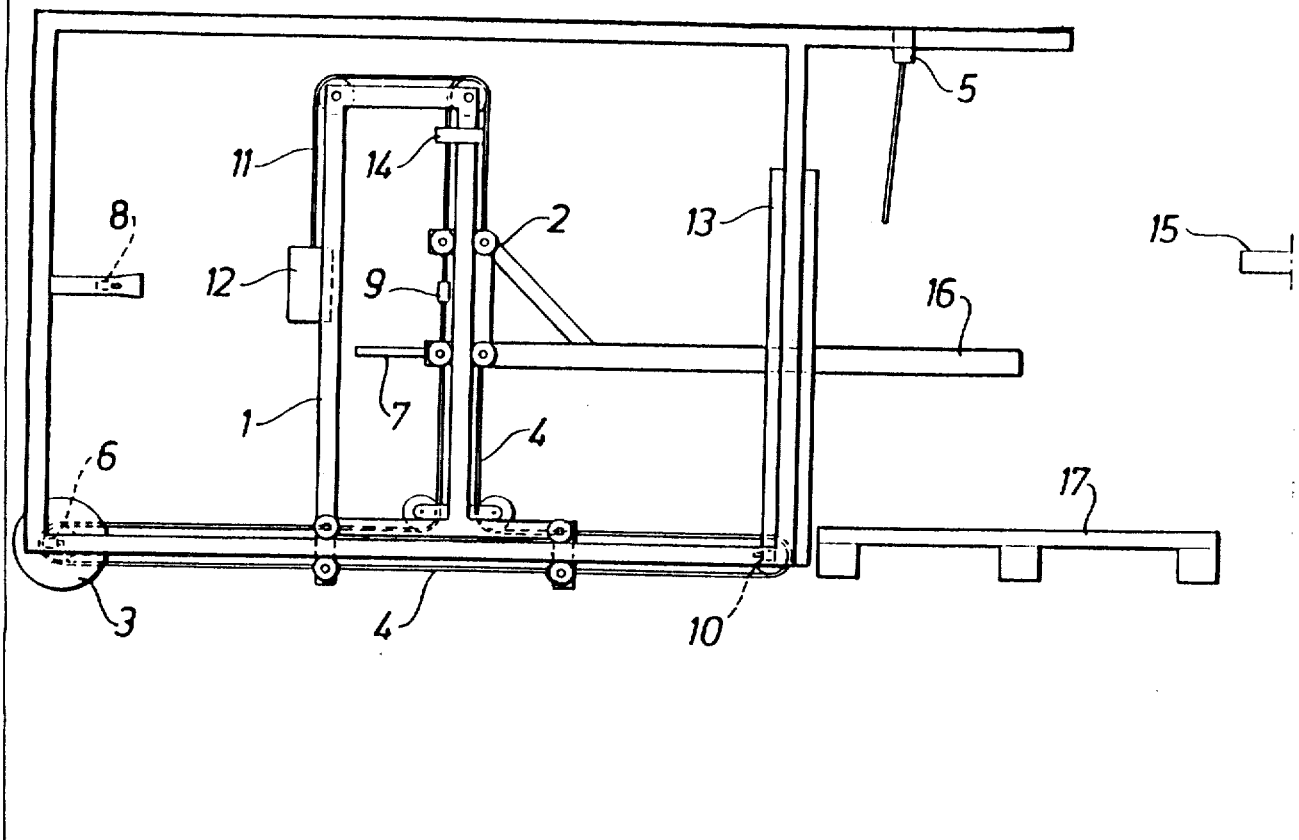

Fig.1

UNITED STATES PATENT AND TRADEMARK OFFICE
CERTIFICATE OF CORRECTION

PATENT NO. : 4,459,076           Page 2 of 2
DATED      : July 10, 1984
INVENTOR(S): Gustaf PETTERSON It is certified that error appears in the above—identified patent and that said Letters Patent are hereby corrected as shown below:

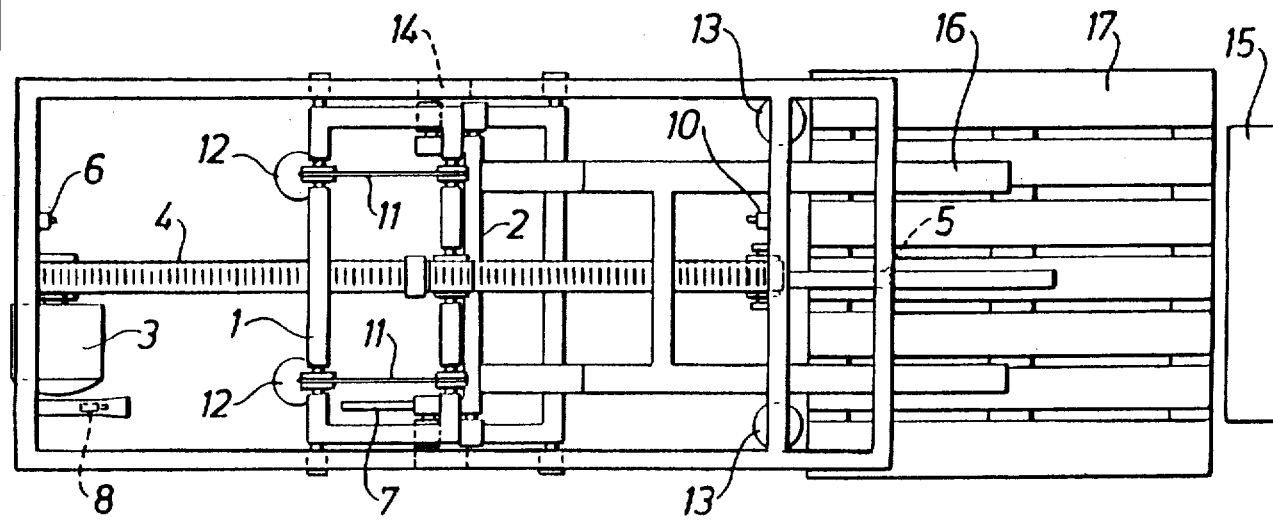

Figure 2:
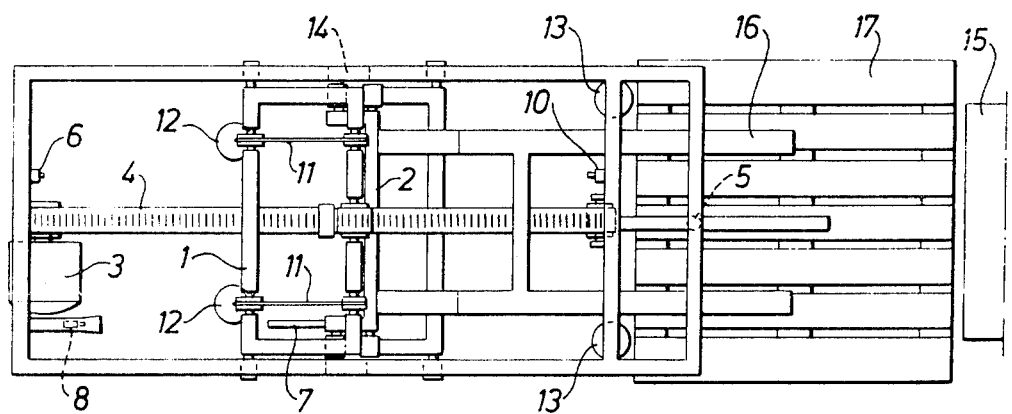
FIG. 2 is illustrating in a schematic top elevational view the device according to the invention as illustrated in FIG. 1.

*Fig.2*

Signed and Sealed this

Ninth Day of July 1985

[SEAL]

*Attest:*

DONALD J. QUIGG

*Attesting Officer*    *Acting Commissioner of Patents and Trademarks*